March 30, 1965 R. E. LEWIS 3,175,857
TRUCK CAMPER

Filed July 31, 1963 2 Sheets-Sheet 1

INVENTOR.
ROBERT E. LEWIS
BY Elliott & Pastoriza
ATTORNEYS

March 30, 1965  R. E. LEWIS  3,175,857
TRUCK CAMPER

Filed July 31, 1963  2 Sheets-Sheet 2

INVENTOR.
ROBERT E. LEWIS
BY *Elliott & Pastoriza*
ATTORNEYS

United States Patent Office 3,175,857
Patented Mar. 30, 1965

3,175,857
TRUCK CAMPER
Robert E. Lewis, 12416 Short Ave.,
Los Angeles 66, Calif.
Filed July 31, 1963, Ser. No. 299,008
3 Claims. (Cl. 296—23)

This invention relates generally to camping equipment and more particularly to an improved collapsible camper for use on a truck bed or box type trailer, or for use alone.

Campers adapted to be mounted on truck beds, trailers, and the like, are well known in the art. Generally these structures are rigid and extend a considerable distance above the cab roof of the truck. Their length is usually co-extensive with the length of the truck bed itself.

One of the major problems encountered with present day campers of the foregoing type results from the bulk and size of the camper itself. Because of its relatively large size, the camper is subject to wind conditions, particularly on high-speed freeways and throughways. High winds not only can cause serious swerving of the truck but in addition could actually topple the camper over. In fact, the wind problem has become so serious that it is inadvisable to drive a truck camper on a freeway or throughway at high speeds.

With the foregoing in mind, it is the primary object of this invention to provide an improved camper primarily designed for a truck bed or box type trailer which may be collapsed to a compact size while travelling and thus not be subject to dangerous wind conditions.

More particularly, it is an object of this invention to provide a camper having a unique rear structure cooperating with the tailgate of a truck bed or box type trailer such that the tailgate can be swung down to a horizontal position and serve as a step or a porch for the camper with the rear of the truck bed itself still closed.

Another object of this invention is to provide an improved camper which may be collapsed to a compact position without overhang at the rear and without introducing complicated components or the like to that end that the collapsing may be carried out by a person manually without the need of special tools.

Briefly, these and many other objects and advantages of this invention are attained by providing a bunk bed structure having front and rear frame members transversely hinged to front and rear portions of the bed structure. The bunk bed structure itself is arranged to be secured to a truck bed or box trailer or simply supported on the ground. The hinging is such that the frame members may swing from erect vertical positions towards collapsed horizontal positions. The rear frame member includes an additional panel for closing the rear of the truck bed when the tailgate is open. This panel is hinged to swing to a compact position to avoid overhang.

Stretched between the frame member is a flexible covering such as canvas or tarpaulin material. Suitable side members, which in themselves are arranged to collapse, extend horizontally between the sides of the front and rear frames to support the frames and canvas so that an enlarged enclosure corresponding in dimensions to conventional campers is realizable. The arrangement is such that the side members will fold as the front and rear frames are swung downwardly towards each other into a horizontal position, the canvas being pulled in by these side members. The resultant structure is extremely compact and enables the camper to be transported over highways and throughways without fear of accidents due to winds.

A better understanding of the invention as well as further features and advantages thereof will be had by now referring to preferred embodiments as disclosed in the accompanying drawings, in which.

Figure 1:
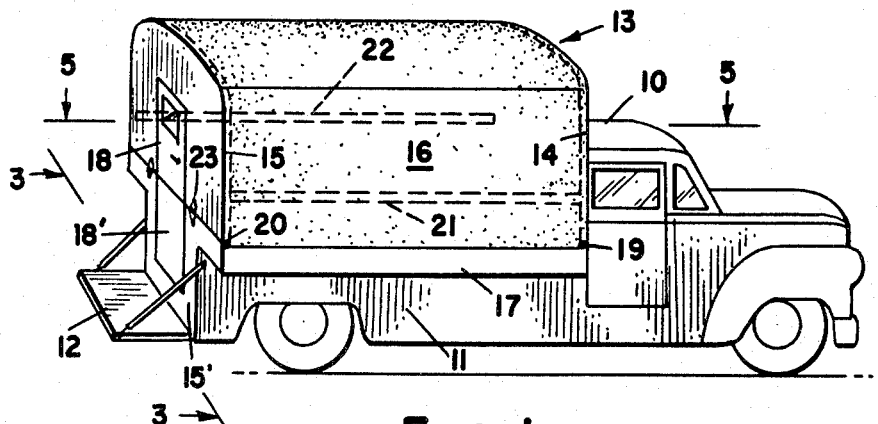
FIGURE 1 is a perspective view illustrating the truck camper in its erect position.

Referring first to FIGURE 1, there is shown a truck 10 having a truck bed 11 for supporting the camper. As shown, the truck bed 11 terminates in a conventional tailgate 12. The camper itself is illustrated at 13 and includes a front frame 14 and a rear split frame 15 and 15'. Between these frames there is stretched a flexible covering such as canvas or tarpaulin material 16. The lower sides of the flexible covering 16 are secured to a rigid bunk bed structure 17 in turn resting on and secured to the top edges of the sides of the truck bed 11 as will be explained in greater detail subsequently. The rear split frame 15 and 15' includes a dutch type door made up of panel sections 18 and 18'.

In the embodiment illustrated in FIGURE 1, the front and rear frames are respectively transversely hinged to the front and rear portions of the bunk bed structure 17 as by hinge means 19 and 20. Horizontal collapsible side members indicated in dotted lines at 21 and 22 are provided to hold the frame members and canvas in their erect positions.

Figure 2:
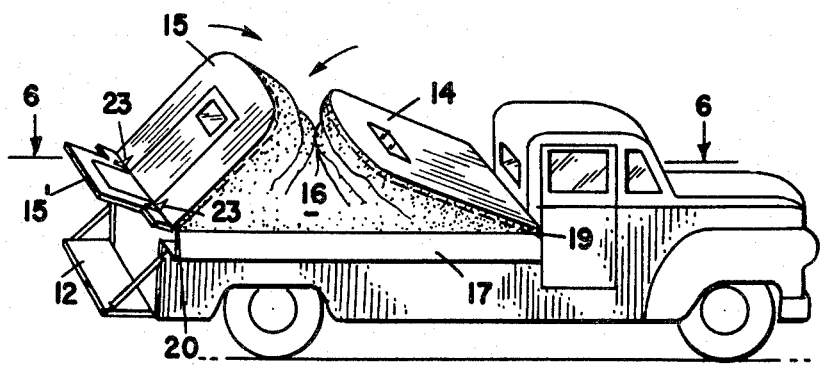
FIGURE 2 is a view similar to FIGURE 1 illustrating the camper in partially collapsed condition.

With particular reference to FIGURE 2, the hinging is such that the front frame member 14 may be swung downwardly in the direction of the arrow towards an horizontal position. The panel portion 15' is hinged to the rear frame portion 15 as by hinges 23 so that the rear frame member 15 may similarly be swung downwardly about the hinge 20 towards the front member 14 to an horizontal position and the portion 15' then swung upwardly to lie against the remaining frame portion 15. Finally, the tailgate 12 may be raised and secured in closed position.

Figures 3, 4:
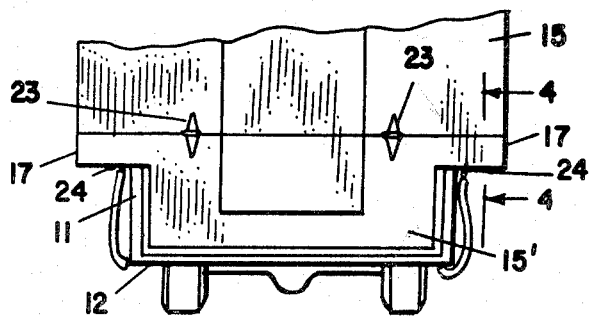
FIGURE 3 is a fragmentary rear view taken in the direction of the arrows 3—3 of FIGURE 1.
FIGURE 4 is a fragmentary side view taken in the direction of the arrows 4—4 of FIGURE 3.

FIGURES 3 and 4 show details of the manner in which the camper is secured to the truck bed and the hinging arrangement for the rear panel in order to effect the above described collapsing of the camper. As shown in both FIGURES 3 and 4, the bunk bed structure 17 may be secured to the top edges of the truck bed 11 by any suitable means such as bolts 24. The hinge structure 20, as best shown in FIGURE 4, has its upper leaf hinge secured to the frame 15 and its lower leaf hinge secured to the bed 17. The lower panel portion 15' in turn is hinged to the upper panel portion by the hinge 23 as described heretofore. The arrangement is such that the panel portions 15 and 15' are co-planar when the frames are erect.

Figure 5:
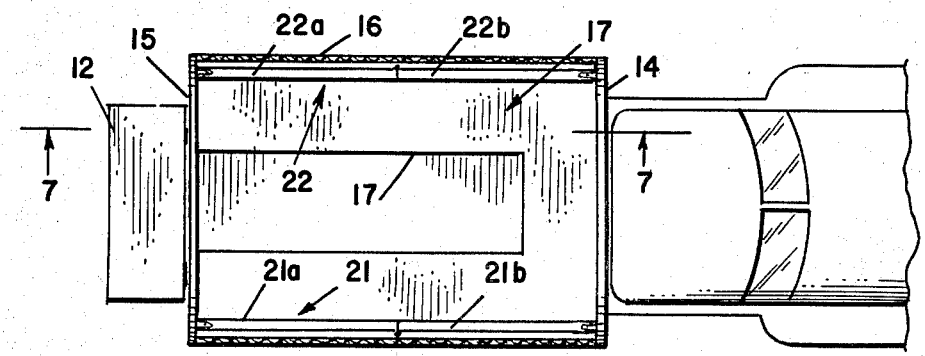
FIGURE 5 is a fragmentary plan view of the camper taken in the direction of the arrows 5—5 of FIGURE 1.
Figure 6:
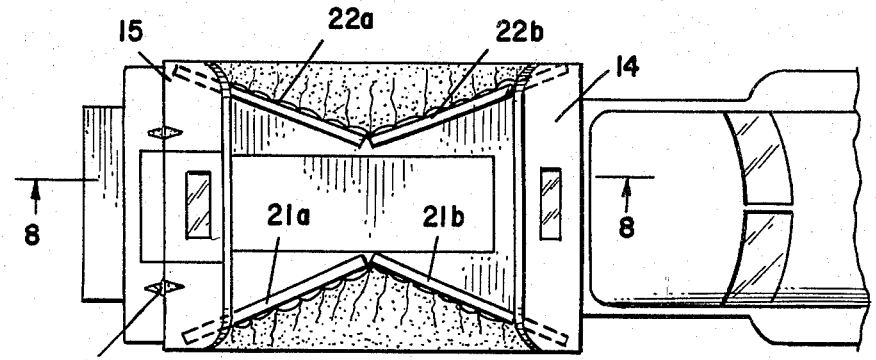
FIGURE 6 is a fragmentary plan view taken in the direction of the arrows 6—6 of FIGURE 2.

Referring now to FIGURES 5 and 6, it will be noted that each of the side members 21 and 22 comprise half portions 21a, 22b, and 22a, 22b, these half portions being hinged together at the center. Further, these half portions are secured to the canvas or flexible covering 16. During the collapsing operation of the front and rear frames 14 and 15, the sides 21 and 22 are crooked at their hinge points as illustrated in FIGURE 6, so that downward swinging movement of the front and rear frames can take place. By enabling the side members to collapse inwardly as illustrated in FIGURE 6, they will pull in the flexible canvas 16 and thus prevent it from dangling loosely over the sides when the trailer is collapsed.

Since the side members 21 and 22 are hinged at their outer ends to the front and rear frames 14 and 15, and since these frames in turn are swung downwardly as the members 21 and 22 crook inwardly, a compound hinging arrangement is required at the ends of the side members to the frame members.

Figure 7:
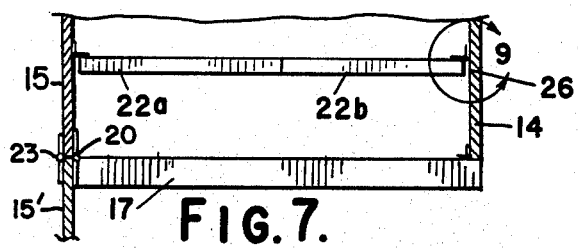
FIGURE 7 is a fragmentary cross-section taken in the direction of the arrows 7—7 of FIGURE 5.
Figure 9:
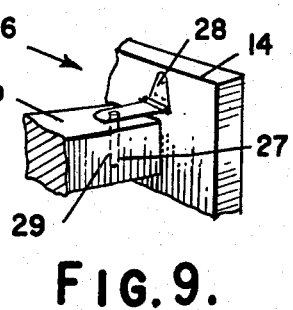
Figure 8:
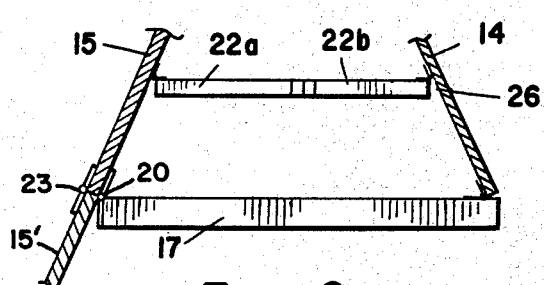
FIGURE 8 is a fragmentary cross-section taken in the direction of the arrows 8—8 of FIGURE 6; and, FIGURE 9 is an enlarged perspective view of the hinge portion enclosed in the circular arrow 9 of FIGURE 7.

FIGURES 7, 8 and 9 illustrate the manner in which the compound hinge functions. Thus, as shown in FIGURE 7 the half member 22b is hinged to the frame 14 by a compound hinge 26. In FIGURE 8, illustrating a partially collapsed position, it will be appreciated that the compound hinge 26 must permit the half member 22b to vary its angle with respect to the front frame 14 and also be capable of swinging about a vertical axis so that it may crook inwardly.

FIGURE 9 shows a fragmentary perspective of one type of hinge 26 for carrying out these functions. As shown, the end of the member 22b includes a vertical bore 27 and is hinged to the front panel 14 as by a hinge 28. One leaf of the hinge 28 registers with the bore 27 and a vertical hinge pin 29 passes therethrough to provide a further hinge. The hinge 28 permits pivoting movement about a horizontal axis and the hinge pin 29 permits pivoting movement about a vertical axis so that the required motions as described in conjunction with FIGURES 6, 7 and 8 can take place.

With the camper collapsed as described, the truck then may be driven on highways and freeways without fear of accidents due to wind.

When it is desired to erect the camper, it is a simple matter to swing open the tailgate, lower the rear panel 15', and then raise the front and rear frames 14 and 15 to their erect positions. The sides 21 and 22 will automatically assume their un-crooked positions and may be locked in such positions by any suitable means. It should be noted that after the tailgate 12 has been lowered to a horizontal position, the lower rear panel portion 15' will serve to close the tail portion of the truck bed, the tailgate itself serving as a horizontal porch or step.

From the foregoing description, it will be evident that the present invention has provided a greatly improved truck camper. Various modifications falling within the scope and spirit of this invention will occur to those skilled in the art. The camper therefore is not to be thought of as limited to the exact embodiments set forth merely for illustrative purposes.

What is claimed is:

1. A camper for a vehicle comprising, in combination: a bunk bed structure adapted to be secured to said vehicle; front and rear supporting frames hinged transversely to the front and rear ends of said bunk bed structure respectively for swinging movement from an erect position towards a horizontal collapsed position; a flexible covering secured to said frames so as to be stretched between said frames when in their erect positions; and support means for holding said frames in their erect positions, said support means including horizontal side members secured to said flexible covering and adapted to crook inwardly in a horizontal plane and move downwardly when said camper is collapsed thereby pulling in said flexible covering, the far ends of said side members terminating in compound hinges, each compound hinge including a first hinge means permitting movement of its connected side member relative to said front and rear frames to take place about a vertical axis when the side member is crooked inwardly and a second hinge means permitting movement of its connected side member to take place relative to said front and rear frames about a horizontal axis when the side member is moved downwardly as said camper is collapsed.

2. A camper according to claim 1, in which said vehicle has a truck bed including a tailgate and in which said rear frame is hinged to said rear end of said bunk bed structure by hinge means positioned at a point spaced upwardly from the lower end of said rear frame a distance substantially equal to the depth of said truck bed so that the portion of said rear frame below said hinge means closes the rear end of said truck bed when said rear frame is in its erect position and said tailgate is swung outwardly to a horizontal position, whereby said tailgate defines a step when said frame means are in their erect positions.

3. A camper according to claim 2, including an additional hinge means hinging said portion of said rear frame below said first mentioned hinge means to the remaining portion of said rear frame so that said portion may be swung upwardly to fold against said remaining portion of said rear frame when said rear frame is in its collapsed position.

References Cited by the Examiner

UNITED STATES PATENTS

| | | | |
|---|---|---|---|
| 1,864,047 | 1/32 | Lawhorne | 296—23 |
| 1,984,681 | 12/34 | Jackson | 135—4 |
| 2,794,672 | 6/57 | Burzi | 296—107 |
| 2,846,262 | 8/58 | Ray | 296—22 |
| 2,860,913 | 11/58 | Kuiper | 296—107 |

MILTON BUCHLER, *Primary Examiner.*

A. HARRY LEVY, *Examiner.*